(12) United States Patent
Wen et al.

(10) Patent No.: US 11,469,683 B2
(45) Date of Patent: Oct. 11, 2022

(54) RECTIFYING CONTROL MODULE, BRIDGE RECTIFYING CONTROL APPARATUS USING ACTIVE SWITCH AND METHOD OF OPERATING THE SAME

(71) Applicant: DELTA ELECTRONICS, INC., Taoyuan (TW)

(72) Inventors: Sheng-Yu Wen, Taoyuan (TW); Cheng-Yi Lin, Taoyuan (TW); Jen-Chieh Tsai, Taoyuan (TW)

(73) Assignee: DELTA ELECTRONICS INC., Taoyuan (TW)

( * ) Notice: Subject to any disclaimer, the term of this patent is extended or adjusted under 35 U.S.C. 154(b) by 0 days.

(21) Appl. No.: 16/773,705

(22) Filed: Jan. 27, 2020

(65) Prior Publication Data
US 2020/0382016 A1 Dec. 3, 2020

(30) Foreign Application Priority Data

May 31, 2019 (CN) .......................... 201910469743.6

(51) Int. Cl.
*H02M 7/219* (2006.01)
*H02M 1/08* (2006.01)

(52) U.S. Cl.
CPC ........... *H02M 7/219* (2013.01); *H02M 1/081* (2013.01); *H02M 7/2195* (2021.05)

(58) Field of Classification Search
CPC ............... H02M 7/219; H02M 7/2195; H02M 2007/2195; H02M 1/0048; H02M 1/0051; H02M 1/0058; H02M 2001/0048; H02M 2001/0051; H02M 2001/0058; H02M 1/08; H02M 1/081
See application file for complete search history.

(56) References Cited

U.S. PATENT DOCUMENTS

| | | | |
|---|---|---|---|
| 9,800,173 B1 | 10/2017 | Chiu | |
| 10,298,118 B1* | 5/2019 | Nam | ..................... H02M 7/217 |
| 10,432,086 B1* | 10/2019 | Kamath | .................. H02M 7/12 |

(Continued)

FOREIGN PATENT DOCUMENTS

| | | |
|---|---|---|
| CN | 109217697 A | 1/2019 |
| TW | 200717990 A | 5/2007 |

(Continued)

*Primary Examiner* — Gustavo A Rosario-Benitez
(74) *Attorney, Agent, or Firm* — Muncy, Geissler, Olds & Lowe, P.C.

(57) ABSTRACT

An active bridge rectifying control apparatus includes a bridge rectifying unit and a rectifying control module. The rectifying control module includes a phase control unit, a low-side drive unit, and a self-drive unit. The phase control unit provides a live line signal and a ground line signal according to a positive half cycle and a negative half cycle of an AC power source. The low-side drive unit provides a low-side control signal according to the live line signal and the ground line signal. The self-drive unit establishes a drive voltage according to the positive half cycle and the negative half cycle of the AC power source, and provides a high-side control signal according to the low-side control signal. The bridge rectifying unit rectifies the AC power source into a DC power source according to the low-side control signal, the high-side control signal, and the drive voltage.

18 Claims, 7 Drawing Sheets

(56) References Cited

U.S. PATENT DOCUMENTS

| | | | | |
|---|---|---|---|---|
| 10,630,168 B1* | 4/2020 | Wang | .................... | H02M 1/083 |
| 2013/0176758 A1* | 7/2013 | Tseng | .................... | H02M 7/219 |
| | | | | 363/89 |
| 2014/0226375 A1* | 8/2014 | Feno | .................... | H02M 1/4233 |
| | | | | 363/44 |
| 2014/0268956 A1* | 9/2014 | Teren | .................... | H02M 7/219 |
| | | | | 363/89 |
| 2017/0302193 A1* | 10/2017 | Zhang | .................... | H02M 7/219 |
| 2018/0097441 A1 | 4/2018 | Chang et al. | | |
| 2019/0006954 A1* | 1/2019 | Hwang | ................. | H02M 7/219 |
| 2019/0074721 A1* | 3/2019 | Cheng | ................. | H04B 5/0037 |
| 2020/0089295 A1* | 3/2020 | Sato | ........................ | H02M 1/32 |
| 2021/0313902 A1* | 10/2021 | Ichiki | .................... | H02M 7/219 |

FOREIGN PATENT DOCUMENTS

| | | |
|---|---|---|
| TW | 201815042 A | 4/2018 |
| WO | WO 2014/151513 A1 | 9/2014 |

* cited by examiner

RECTIFYING CONTROL MODULE, BRIDGE RECTIFYING CONTROL APPARATUS USING ACTIVE SWITCH AND METHOD OF OPERATING THE SAME

BACKGROUND

Technical Field

The present disclosure relates to a rectifying control module, an active bridge rectifying control apparatus, and a method of operating the same, and more particularly to an active bridge rectifying control apparatus, and a method of operating the same which are actively controlled.

Description of Related Art

In today's electronic field, most of the full-bridge bridge rectifiers are mainly passive bridge rectifiers composed of four diodes, and an AC power source is rectified into a DC power source by the forward bias or reverse bias of the diodes.

However, when the bridge rectifier composed of the four diodes is forward biased in the diodes, since the forward bias voltage of the diode is higher (the forward bias voltage is about 0.7 volts), if the input current is large, the power consumption of the bridge rectifier is large, that is, the power consumption P is equal to twice the forward bias voltage multiplied by the input current.

SUMMARY

In order to solve the above-mentioned problems, the present disclosure provides an active bridge rectifying control apparatus. The active bridge rectifying control apparatus includes a bridge rectifying unit and a rectifying control module. The bridge rectifying unit receives an AC power source through a live wire and a ground wire. The rectifying control module includes a phase control unit, a low-side drive unit, and a self-drive unit. The phase control unit includes a live wire switch coupled to the live wire and a ground wire switch coupled to the ground wire. The low-side drive unit is coupled to the live wire switch, the ground wire switch, and the bridge rectifying unit. The self-drive unit is coupled to the low-side drive unit and the bridge rectifying unit. A positive half cycle of the AC power source turns on the live wire switch and provides a live wire signal, and a negative half cycle of the AC power source turns on the ground wire switch and provides a ground wire signal. The low-side drive unit provides a low-side control signal according to the live wire signal and the ground wire signal. The self-drive unit establishes a drive voltage according to the AC power source, and provides a high-side control signal according to the low-side control signal. The bridge rectifying unit rectifies the AC power source into a DC power source according to the low-side control signal, the high-side control signal, and the drive voltage.

In order to solve the above-mentioned problems, the present disclosure provides a rectifying control module. The rectifying control module controls a bridge rectifying unit to rectify an AC power source into a DC power source. The rectifying control module includes a phase control unit, a low-side drive unit, and a self-drive unit. The phase control unit includes a live wire switch coupled to a live wire and a ground wire switch coupled to a ground wire, and the live wire and the ground wire receive the AC power source. The low-side drive unit is coupled to the live wire switch, the ground wire switch, and the bridge rectifying unit. The self-drive unit is coupled to the low-side drive unit and the bridge rectifying unit. A positive half cycle of the AC power source turns on the live wire switch and provides a live wire signal, and a negative half cycle of the AC power source turns on the ground wire switch and provides a ground wire signal. The low-side drive unit provides a low-side control signal according to the live wire signal and the ground wire signal, and provides the low-side control signal to control the bridge rectifying unit. The self-drive unit establishes a drive voltage according to the AC power source, provides a high-side control signal according to the low-side control signal, and provides the drive voltage and the high-side control signal to control the bridge rectifying unit.

In order to solve the above-mentioned problems, the present disclosure provides a method of operating an active bridge rectifying control apparatus. The method includes the steps of: receiving, by a bridge rectifying unit, an AC power source through a live wire and a ground wire; turning on, by a positive half cycle of the AC power source, a live wire switch of a phase control unit to provide a live wire signal, and turning on, by a negative half cycle of the AC power source, a ground wire switch of the phase control unit to provide a ground wire signal; providing, by a low-side drive unit, a low-side control signal according to the live wire signal and the ground wire signal; establishing, by a self-drive unit, a drive voltage according to the AC power source, and providing a high-side control signal according to the low-side control signal; rectifying, by the bridge rectifying unit, the AC power source into a DC power source according to the low-side control signal, the high-side control signal, and the drive voltage.

DETAILED DESCRIPTION

Figure 1:
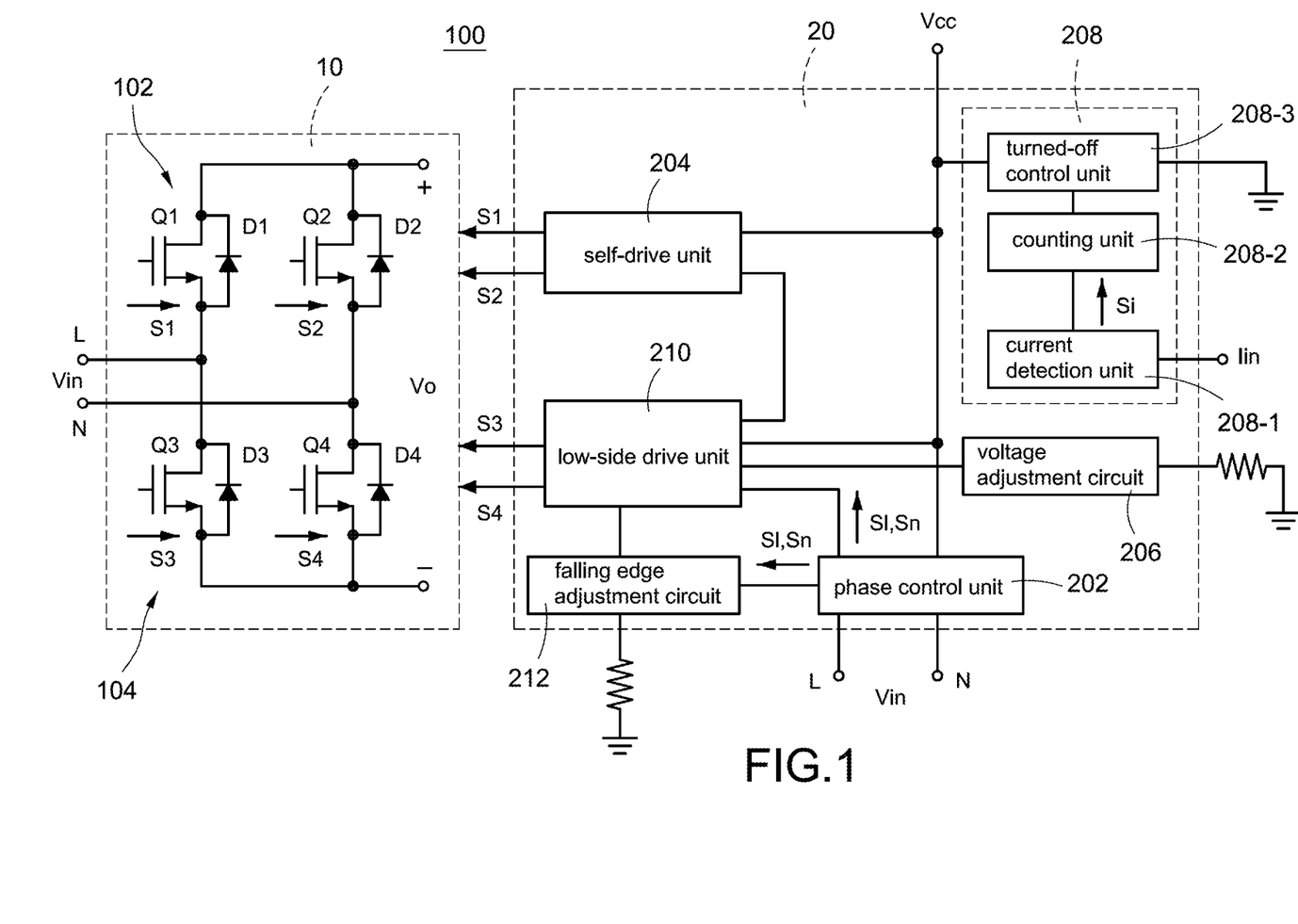
FIG. 1 shows a block circuit diagram of an active bridge rectifying control apparatus according to the present disclosure.

Please refer to FIG. 1. The active bridge rectifying control apparatus 100 rectifies an AC power source Vin into a DC power source Vo. The active bridge rectifying control apparatus 100 includes a bridge rectifying unit 10 and a rectifying control module 20. The bridge rectifying unit 10 is coupled to the rectifying control module 20. The rectifying control module 20 includes a phase control unit 202, a self-drive unit 204, and a low-side drive unit 210. The bridge rectifying unit 10 receives the AC power source Vin through a live wire L and a ground wire N, and actively or passively rectifies the AC power source Vin into the DC power source Vo. The bridge rectifying unit 10 includes a high-side unit 102 and a low-side unit 104. The high-side unit 102 includes a first switch Q1 and a second switch Q2, and the low-side unit 104 includes a third switch Q3 and a fourth switch Q4. The first switch Q1 is coupled to the live wire L and is connected to a first diode D1 in parallel. The second switch Q2 is coupled to the ground wire N and the first switch Q1, and is connected to a second diode D2 in parallel. The third switch Q3 is coupled to the live wire L and the first switch Q1, and is connected to a third diode D3 in parallel. The fourth switch Q4 is coupled to the third switch Q3 and is coupled to the ground wire N and the second switch Q2, and is connected to a fourth diode D4 in parallel. One end of the DC power source Vo is coupled to a common-connected point between the first switch Q1 and the second switch Q2, and the other end of the DC power source Vo is coupled to a common-connected point between the third switch Q3 and the fourth switch Q4.

The phase control unit 202 is coupled to the AC power source Vin and the low-side drive unit 210, detects the AC power source Vin in a positive half cycle and in a negative half cycle, and provides a live wire signal S1 or a ground wire signal Sn to the low-side drive unit 210. The low-side drive unit 210 is coupled to the bridge rectifying unit 10 and the self-drive unit 204, and provides low-side control signals S3, S4 to the bridge rectifying unit 10 and the self-drive unit 204 according to the live wire signal S1 and the ground wire signal Sn. The self-drive unit 204 is coupled to the bridge rectifying unit 10, establishes a drive voltage according to the positive half cycle and the negative half cycle of the AC power source Vin, and provides high-side control signals S1, S2 to the bridge rectifying unit 10 according to the low-side control signals S3, S4. The bridge rectifying unit 10 rectifies the AC power source Vin into the DC power source Vo according to the low-side control signals S3, S4, the high-side control signals S1, S2, and the drive voltage.

Specifically, the high-side control signals S1, S2 include a first control signal S1 provided to the first switch Q1 and a second control signal S2 provided to the second switch Q2. The low-side control signals S3, S4 include a third control signal S3 provided to the third switch Q3 and a fourth control signal S4 provided to the fourth switch Q4. The phase control unit 202 provides the live wire signal S1 to the low-side drive unit 210 according to the positive half cycle of the AC power source Vin. The low-side drive unit 210 provides the fourth control signal S4 to the fourth switch Q4 and the self-drive unit 204, and the self-drive unit 204 provides the first control signal S1 to the first switch Q1 according to the fourth control signal S4. The self-drive unit 204 provides the ground wire signal Sn to the low-side drive unit 210 according to the negative half cycle of the AC power source Vin. The low-side drive unit 210 provides the third control signal S3 to the third switch Q3 and the self-drive unit 204 according to the ground wire signal Sn, and the self-drive unit 204 provides the second control signal S2 to the second switch Q2 according to the third control signal S3.

Further, since the third switch Q3 and the fourth switch Q4 of the bridge rectifying unit 10 are grounded, the reference potential of turning on the third switch Q3 and the fourth switch Q4 is the ground potential. Therefore, the third control signal S3 and the fourth control signal S4 provided from the low-side drive unit 210 can directly turn on the second switch Q2 and the fourth switch Q4. However, since the reference potential of turning on the first switch Q1 and the second switch Q2 is not the ground potential (i.e., the reference potential is the live wire L or the ground wire N), the self-drive unit 204 has to provide the drive voltage to successfully turn on the first switch Q1 through the first control signal S1 and turn on the second switch Q2 through the second control signal S2. In one embodiment, the phase control unit 202, the self-drive unit 204, and the low-side drive unit 210 may be integrated into a microcontroller. Further, the microcontroller may include the bridge rectifying unit 10 or not. In other words, the active bridge rectifying control apparatus 100 may be a control apparatus composed of circuit components.

Please refer to FIG. 1 again, the rectifying control module 20 further includes a voltage adjustment circuit 206. The voltage adjustment circuit 206 is coupled to the low-side drive unit 210. The voltage adjustment circuit 206 adjusts a voltage level of the low-side unit 104 so that the third control signal S3 and the fourth control signal S4 can successfully turn on the third switch Q3 and the fourth switch Q4. Specifically, due to the variety of switches Q1-Q4 in the bridge rectifying unit 10, the turned-on voltages required for the different switches are different, for example but not limited to 3 to 20 volts. Therefore, the voltage adjustment circuit 206 adjusts the voltage level provided to the low-side unit 104 so that the third control signal S3 and the fourth control signal S4 can successfully turn on the third switch Q3 and the fourth switch Q4. In one embodiment, the voltage adjustment circuit 206 can use, for example but not limited to, a resister to adjust the voltage level provided to the low-side unit 104. In other words, as long as any circuit can adjust the voltage level, it should be as the voltage adjustment circuit 206 and included in the scope of the present embodiment.

The rectifying control module 20 further includes a load control unit 208. The load control unit 208 includes a current detection unit 208-1, a counting unit 208-2, and a turned-off control unit 208-3. The current detection unit 208-1 is coupled to the AC power source Vin, the counting unit 208-2 is coupled to the current detection unit 208-1 and the turned-off control unit 208-3, and the turned-off control unit 208-3 is coupled between an input power source Vcc and a ground end. The current detection unit 208-1 detects an input current Iin of the AC power source Vin and provides a current signal Si to the turned-off control unit 208-3 according to the input current Iin. Simultaneously, the counting unit 208-2 provides a counting period to the turned-off control unit 208-3. The turned-off control unit 208-3 determines whether the input power source Vcc is coupled to the ground end according to the current signal Si and the counting period.

Specifically, the turned-off control unit 208-3 determines whether the bridge rectifying unit 10 is in a light-loading condition. If the bridge rectifying unit 10 is in the light-loading condition, the counting unit 208-2 starts to count. When a time period that the bridge rectifying unit 10 is in the light-loading condition is greater than or equal to the counting period set by the counting unit 208-2, the turned-off control unit 208-3 turns on an internal switch (not shown) so that the input power source Vcc for the operation of the rectifying control module 20 is grounded. At this condition, the input power source Vcc is coupled to the low-side drive unit 210 and the self-drive unit 204. When the input power source Vcc is grounded, the low-side drive unit 210 and the self-drive unit 204 do not operate due to the absence of the input power source Vcc. Since the low-side drive unit 210 and the self-drive unit 204 do not operate, the bridge rectifying unit 10 passively rectifies the AC power source Vin into the DC power source Vo. At this condition, the bridge rectifying unit 10 can only passively rectify the AC power source Vin into the DC power source Vo through the first diode D1 and the fourth diode D4, or the second diode D2 and the third diode D3. In particular, when the switches Q1-Q4 operate at the light-loading condition, the efficiency is low. At this condition, the bridge rectifying unit 10 operates from an active mode to a passive mode, thereby increasing the efficiency of the bridge rectifying unit 10 at the light-loading condition. The active mode means the rectifying control module 20 provides the control signals S1-S4 to control the switches Q1-Q4 to make the AC power source Vin be rectified into the DC power source Vo through the switches Q1-Q4. The passive mode means the rectifying control module 20 does not provide the control signals S1-S4 to control the switches Q1-Q4 so that the AC power source Vin is rectified into the DC power source Vo through diodes D1-D4. In one embodiment, the diodes D1-D4 can be used to passively rectify the AC power source Vin into the DC power source Vo, and further to bypass excess energy, such as preventing inrush current and preventing the reverse of the DC power source Vo.

Figure 2:
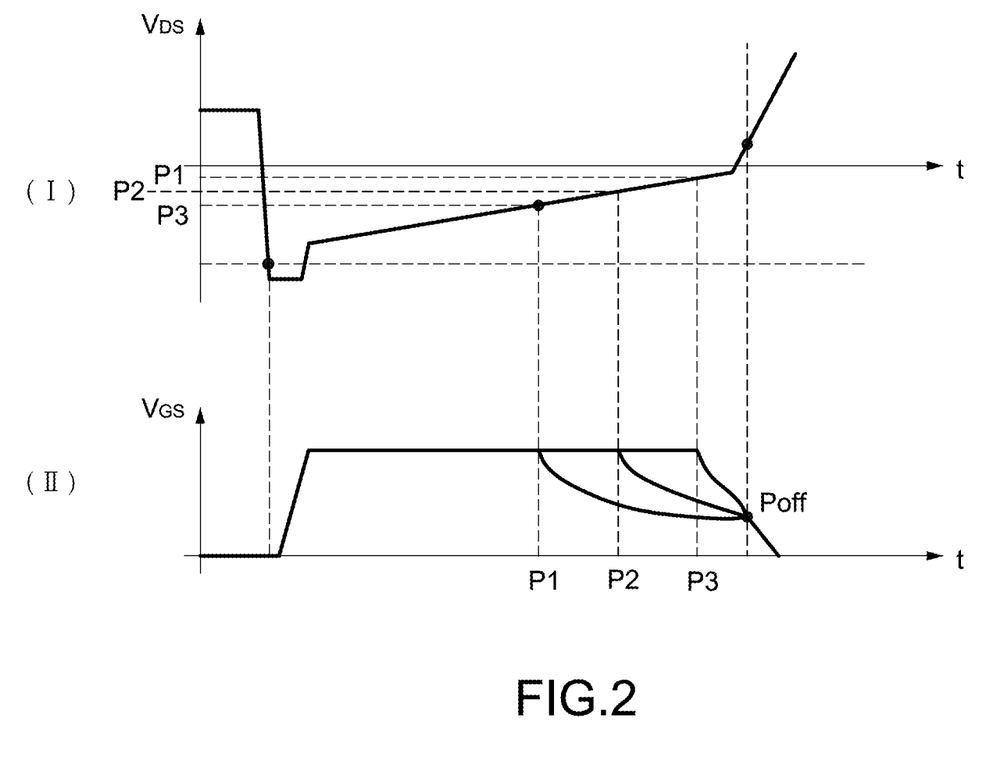
FIG. 2 shows schematic control waveforms of a falling edge adjustment circuit according to the present disclosure.

Please refer to FIG. 2 and also refer to FIG. 1. As shown in FIG. 1, the rectifying control module 20 further includes a falling edge adjustment circuit 212. The falling edge adjustment circuit 212 is coupled to the phase control unit 202 and the low-side drive unit 210. The falling edge adjustment circuit 212 adjusts a falling point of a falling edge of the third control signal S3 and that of the fourth control signal S4 according to the live wire signal S1 and the ground wire signal Sn provided from the phase control unit 202, thereby avoiding causing a short through between the first switch Q1 and the third switch Q3 or between the second switch Q2 and the fourth switch Q4.

As shown in FIG. 2, when the third control signal S3 turns on the third switch Q3 or the fourth control signal S4 turns on the fourth switch Q4, the third control signal S3 and the fourth control signal S4 (i.e., the low-side control signals) pull up (pull high) a voltage between the gate and the source of the third switch Q3 and that of the fourth switch Q4 (shown in waveform II), and therefore the third switch Q3 and the fourth switch Q4 are turned on. Since the third switch Q3 and the fourth switch Q4 are turned on, a voltage between the gate and source of the third switch Q3 and that of the fourth switch Q4 pull down (pull low) (shown in waveform I). If the voltage between the gate and source of the third switch Q3 and that of the fourth switch Q4 are low to a turned-off point Poff, the third switch Q3 and the fourth switch Q4 are turned off. The falling edge adjustment circuit 212 adjusts falling points P1-P3 of the falling edge of the third control signal S3 or the fourth control signal S4 according to the live wire signal S1 or the ground wire signal Sn so that the switches Q3,Q4 are turned off early a leading period according to the falling points P1-P3. In particular, a period from the falling points P1-P3 to the turned-off point Poff is the leading period. In one embodiment, the falling edge adjustment circuit 212 uses, for example but not limited to, a resistor to adjust the falling points of the falling edge of the third control signal S3 or the fourth control signal S4. In other words, as long as any circuit can adjust the falling points of the falling edge of the third control signal S3 or the fourth control signal S4, it should be as the falling edge adjustment circuit 212 and included in the scope of the present embodiment.

Figure 3:
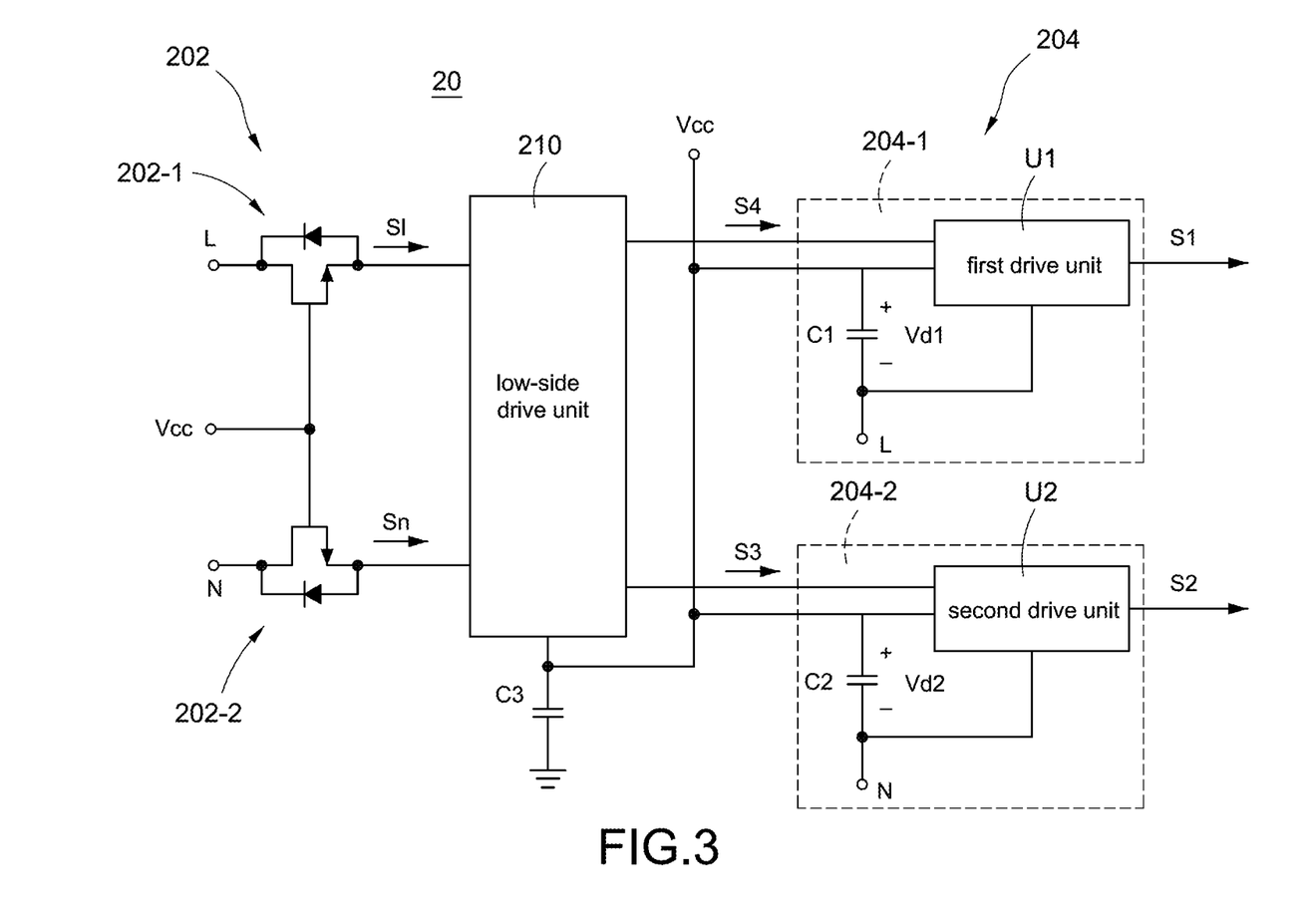
FIG. 3 shows a circuit block diagram of a rectifying control module according to the present disclosure.

Please refer to FIG. 3, and also refer to FIG. 1 to FIG. 2. The phase control unit 202 includes a live wire switch 202-1 and a ground wire switch 202-2. One end of the live wire switch 202-1 is coupled to the live wire L, another end thereof is coupled to the low-side drive unit 210, and a control end thereof is coupled to the input power source Vcc. One end of the ground wire switch 202-2 is coupled to the ground wire N, another end thereof is coupled to the low-side drive unit 210, and a control end thereof is coupled to the input power source Vcc. When the AC power source Vin is available, the positive half cycle of the AC power source Vin turns on the live wire switch 202-1 so that the phase control unit 202 provides the live wire signal S1 to the low-side drive unit 210, and the negative half cycle of the AC power source Vin turns on the ground wire switch 202-2 so that the phase control unit 202 provides the ground wire signal Sn to the low-side drive unit 210. An energy storage capacitor C3 is coupled to the input power source Vcc and the low-side drive unit 210, and the input power source Vcc charges the energy storage capacitor C3 to provide the required power for the operation of the low-side drive unit 210.

The self-drive unit 204 includes a first self-drive unit 204-1 and a second self-drive unit 204-2. The first self-drive unit 204-1 includes a first bootstrap capacitor C1 and a first drive unit U1. One end of the first bootstrap capacitor C1 is coupled to the live wire L and the other end of the first bootstrap capacitor C1 is coupled to the first drive unit U1 and the input power source Vcc, and the first drive unit U1 is coupled to the low-side drive unit 210 and the first switch Q1. The second self-drive unit 204-2 includes a second bootstrap capacitor C2 and a second drive unit U2. One end of the second bootstrap capacitor C2 is coupled to the ground wire N and the other end of the second bootstrap capacitor C2 is coupled to the second drive unit U2 and the input power source Vcc, and the second drive unit U2 is coupled to the low-side drive unit 210 and the second switch Q2.

Specifically, when the AC power source Vin is available, the input power source Vcc charges the energy storage capacitor C3 so that the energy storage capacitor C3 provides the required power for the operation of the low-side drive unit 210. When the AC power source Vin is in the positive half cycle, the live wire switch 202-1 is turned on and the live wire signal S1 is provided to the low-side drive unit 210. The low-side drive unit 210 provides the fourth control signal S4 to the first drive unit U1 according to the live wire signal S1, and the first drive unit U1 provides the first control signal S1 to the first switch Q1 according to the fourth control signal S4.

When the AC power source Vin is in the positive half cycle, the second bootstrap capacitor C2 is charged through a path formed from the input power source Vcc to the ground wire N so that the second bootstrap capacitor C2 establishes a second drive voltage Vd2. However, the first bootstrap capacitor C1 fails to be charged through the path since the live wire L is high-potential. When the AC power source Vin is in the negative half cycle, the second drive voltage Vd2 is provided to the second switch Q2 through the second drive unit U2 so that the second switch Q2 is turned on according to the second control signal S2 and the second drive voltage Vd2. In particular, the operation in the negative half cycle of the AC power source Vin is just contrary to that in the positive half cycle of the AC power source Vin, and the detail description is omitted here for conciseness.

Figure 4A:
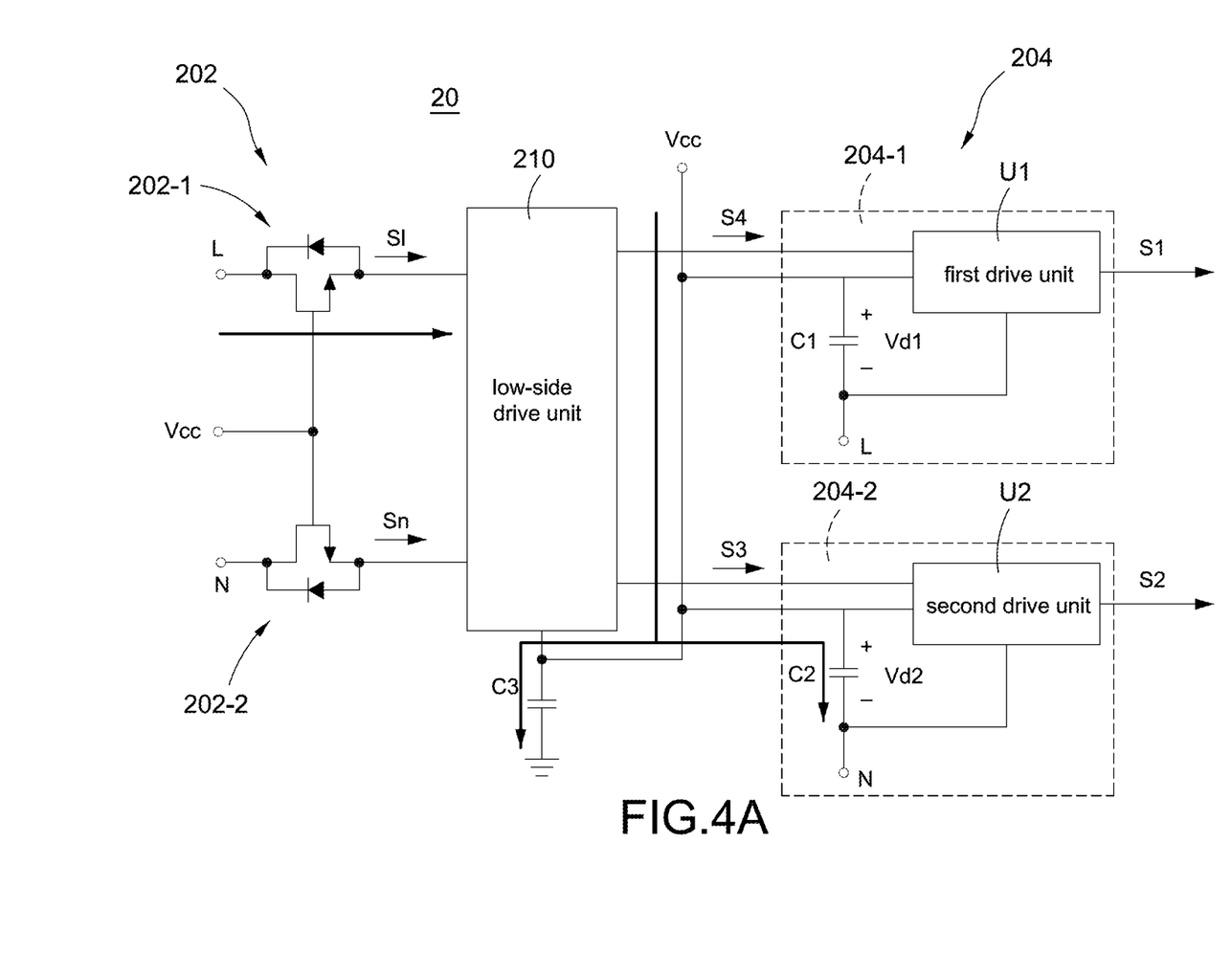
FIG. 4A shows a schematic current path in a first half cycle of the active bridge rectifying control apparatus according to the present disclosure.
Figure 4B:
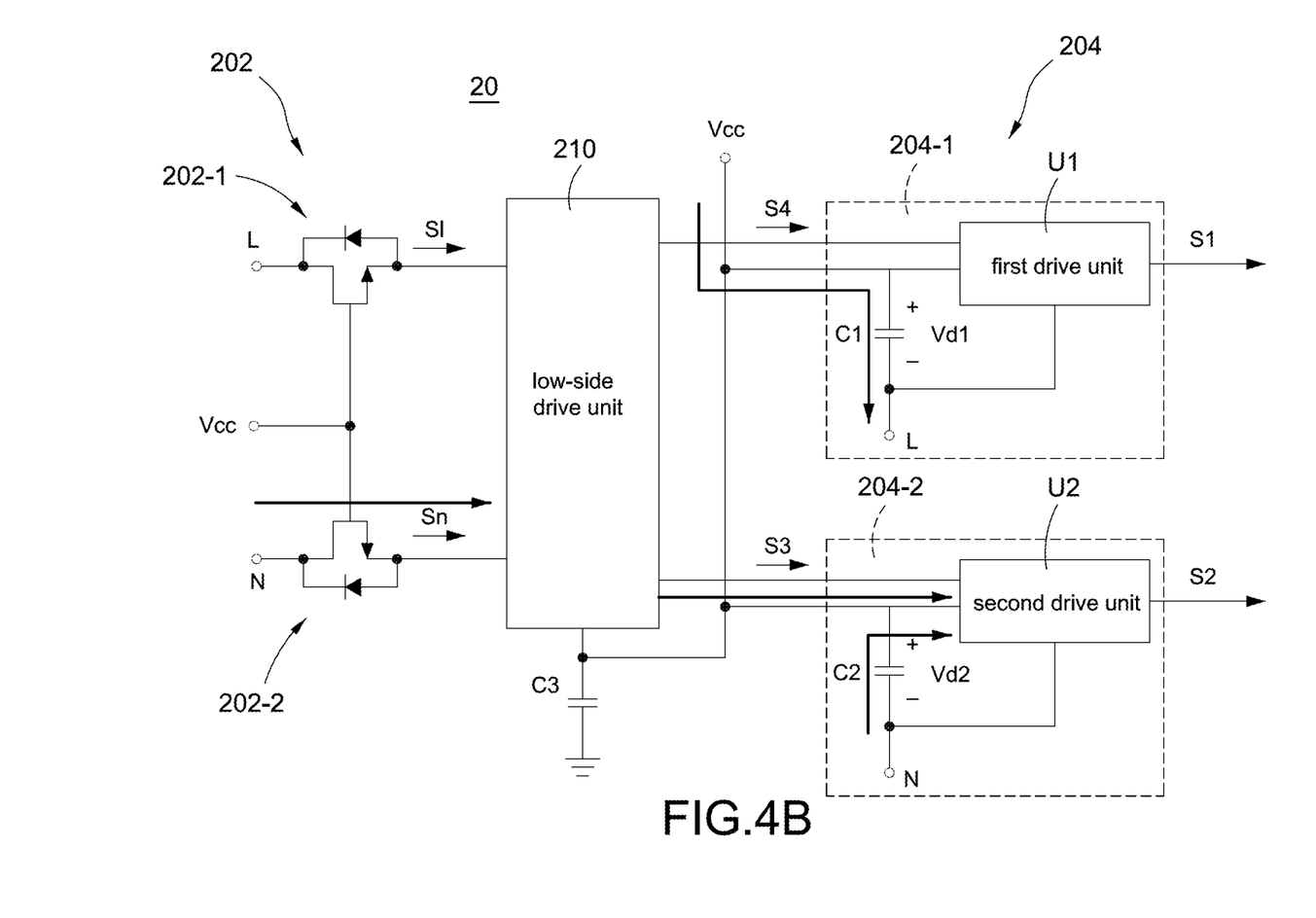
FIG. 4B shows a schematic current path in a second half cycle of the active bridge rectifying control apparatus according to the present disclosure.
Figure 4C:
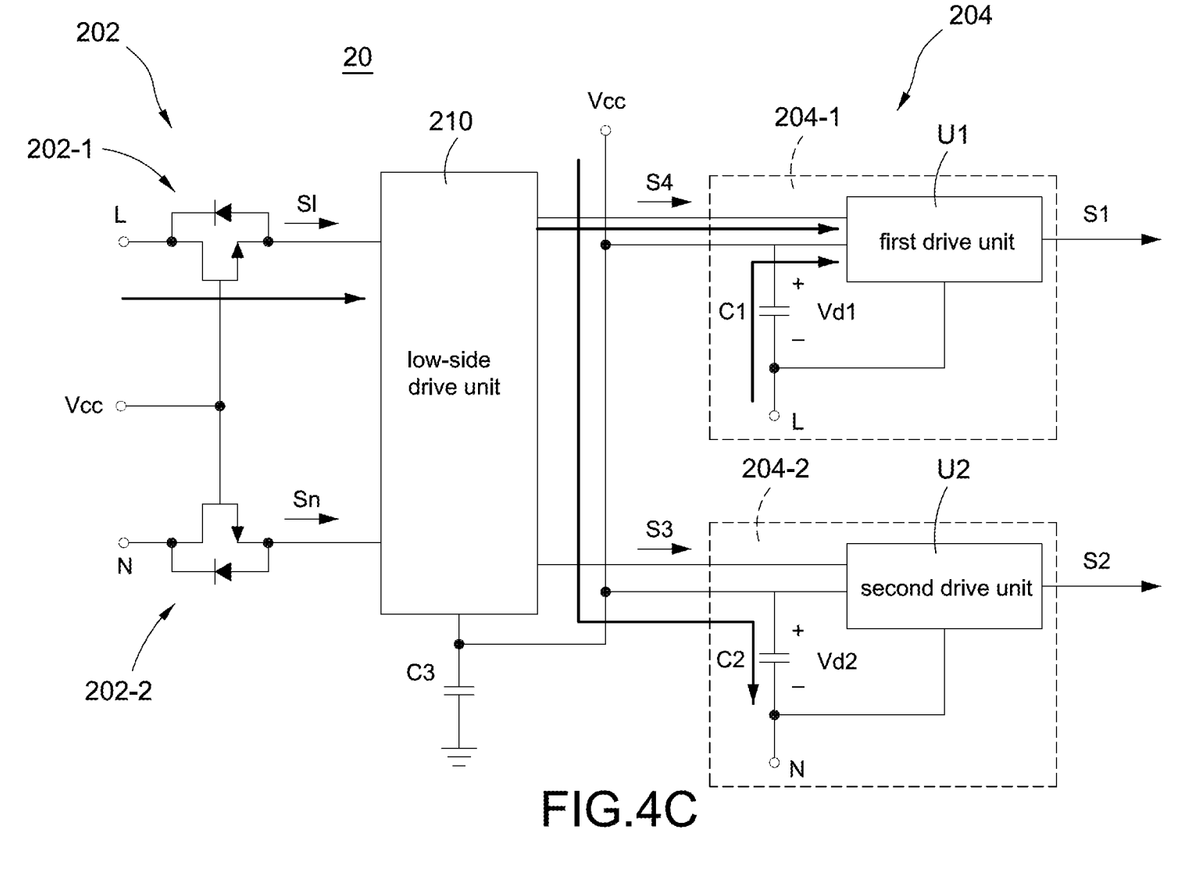
FIG. 4C shows a schematic current path in a third half cycle of the active bridge rectifying control apparatus according to the present disclosure.
Figure 5:
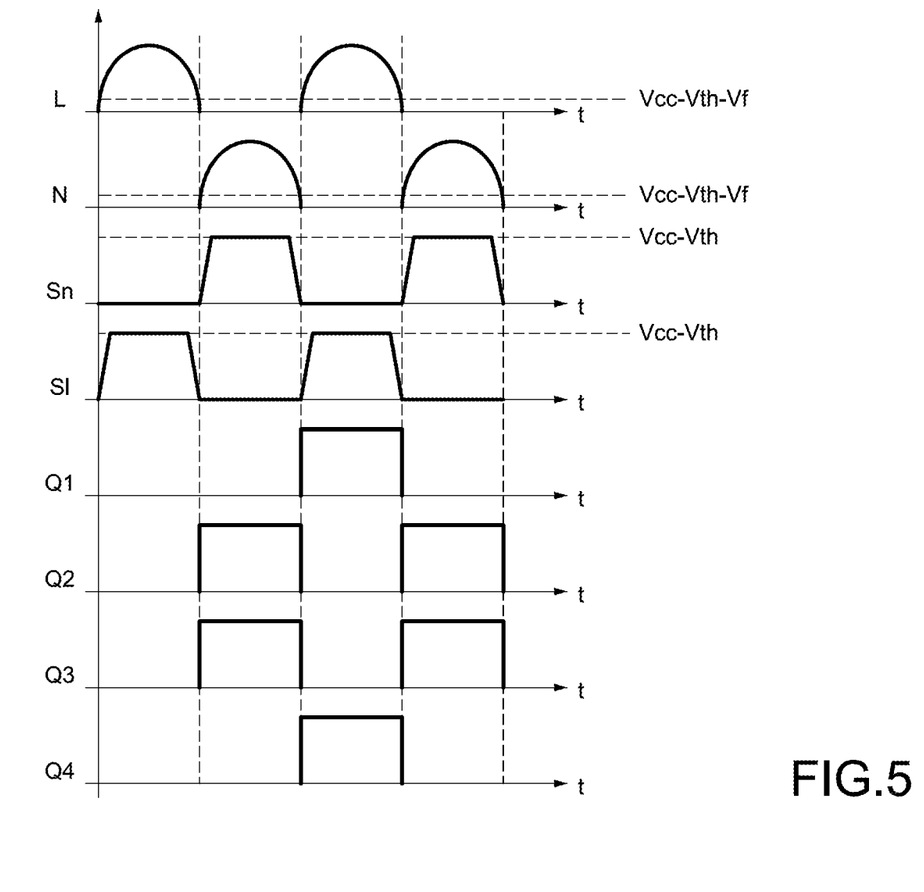
FIG. 5 shows schematic voltage waveforms of controlling the active bridge rectifying control apparatus according to the present disclosure.

Please refer to FIG. 4A to FIG. 5, and also refer to FIG. 1 to FIG. 3. Take the positive half cycle as the first half cycle for example, when the AC power source Vin is available (as shown in FIG. 4 and FIG. 5), the voltage of the live wire L turns on the live wire switch 202-1 so that the live wire switch 202-1 provides the live wire signal S1. At this condition, the input power source Vcc starts to charge the energy storage capacitor C3, but charging is not done yet. Therefore, although the live wire signal S1 is available, the energy stored in the energy storage capacitor C3 fails to meet the required operation power of the low-side drive unit 210. Therefore, the low-side drive unit 210 does not operate and the low-side drive unit 210 fails to provide the fourth control signal S4 according to the live wire signal S1. At this condition, an energy-storing path of the second bootstrap capacitor C2 by the input power source Vcc is formed by the input power source Vcc, the second bootstrap capacitor C2, and the ground wire N, and therefore the second drive voltage Vd2 is established for preparing to drive the second switch Q2 in the negative half cycle. Since the low-side drive unit 210 does not work, the rectifying control module 20 does not output any control signal. At this condition, the AC power source Vin passes through the first diode D1 and the fourth diode D4 so that the AC power source Vin (i.e., the input power source) is passively rectified into the DC power source Vo (i.e., the output power source). Since the rectifying control module 20 does not work when the available power of the AC power source Vin has not been completed, i.e., the AC power source Vin is still unstable, the passive rectification of the bridge rectifying unit 10 is performed in the first half cycle, and therefore the rectifying control module 20 can be prevented from malfunctioning due to the unstable operation.

Further, when a voltage value of the AC power source Vin is less than or equal to a voltage value that is equal to a voltage value of the input power source Vcc minus a turned-on voltage Vth and further minus a diode junction voltage Vf of the live wire switch 202-1, the live wire switch 202-1 is in an unsaturated state and in an ohmic region. When the voltage value of the AC power source Vin is greater than the voltage value of the input power source Vcc, the live wire switch 202-1 is in a cutoff region. Therefore, a voltage waveform of the live wire signal S1 is a trapezoidal wave, and the high voltage value is equal to the voltage value of the input power source Vcc minus the turned-on voltage Vth. When the voltage value of the input power source Vcc is gradually reduced to below the voltage value that is equal to the voltage value of the input power source Vcc minus the turned-on voltage Vth and further minus the diode junction voltage Vf of the live wire switch 202-1, the live wire switch 202-1 is turned off. In particular, the phase detection and control manner of the ground wire switch 202-2 is similar to those of the live wire switch 202-1.

Please refer to FIG. 4B and FIG. 5. When the AC power source Vin is in the second half cycle (i.e., the negative half cycle), the energy storage capacitor C3 is fully charged and provides the required power for the operation of the low-side drive unit 210 so that the low-side drive unit 210 starts operating (hereafter the low-side drive unit 210 operates). At this condition, the voltage of the ground wire N turns on the ground wire switch 202-2 so that the ground wire switch 202-2 provides the ground wire signal Sn. The low-side drive unit 210 produces the third control signal S3 according to the ground wire signal Sn and provides the third control signal S3 to the second drive unit U2 and turns on the third switch Q3. At this condition, an energy-storing path of the first bootstrap capacitor C1 by the input power source Vcc is formed by the input power source Vcc, the first bootstrap capacitor C1, and the live wire L, and therefore a first drive voltage Vd1 is established for preparing to drive the first switch Q1 in the positive half cycle (as shown in FIG. 4A). Due to the difference in potential, the input power source Vcc fails to charge the second bootstrap capacitor C2. At this condition, the second bootstrap capacitor C2 provides the second drive voltage Vd2 to the second switch Q2 through the second drive unit U2, and the second drive unit U2 receives the third control signal S3 and provides the second control signal S2 to the second switch Q2 according to the third control signal S3. Since the second switch Q2 receives the second control signal S2 and the second drive voltage Vd2, the second switch Q2 is turned on. At this condition, the AC power source Vin is rectified into the DC power source Vo by turning on the second switch Q2 and the third switch Q3.

Please refer to FIG. 4C and FIG. 5. When the AC power source Vin is in the third half cycle (i.e., the positive half cycle), the voltage of the live wire L turns on the live wire switch 202-1 so that the live wire switch 202-1 provides the live wire signal S1. The low-side drive unit 210 produces the fourth control signal S4 according to the live wire signal S1 and provides the fourth control signal S4 to the first drive unit U1 and turns on the fourth switch Q4. At this condition, an energy-storing path of the second bootstrap capacitor C2 by the input power source Vcc is formed by the input power source Vcc, the second bootstrap capacitor C2, and the ground wire N, and therefore the second drive voltage Vd2 is established for preparing to drive the second switch Q2 in the negative half cycle (as shown in FIG. 4B). Due to the difference in potential, the input power source Vcc fails to charge the first bootstrap capacitor C1. At this condition, the first bootstrap capacitor C1 provides the first drive voltage Vd1 to the first switch Q1 through the first drive unit U1, and the first drive unit U1 receives the fourth control signal S4 and provides the first control signal S1 to the first switch Q1 according to the fourth control signal S4. Since the first switch Q1 receives the first control signal S1 and the first drive voltage Vd1, the first switch Q1 is turned on. At this condition, the AC power source Vin is rectified into the DC power source Vo by turning on the first switch Q1 and the fourth switch Q4. Afterward, the active bridge rectifying control apparatus 100 repeatedly and continuously to actively rectify the AC power source Vin into the DC power source Vo according to the operations shown in FIG. 4B and FIG. 4C.

What is claimed is:

1. A bridge rectifying control apparatus using active switch, comprising:
   a bridge rectifying unit configured to receive an AC power source through a live wire and a ground wire, and comprising a first switch and a third switch connected in series, and a second switch and a fourth switch connected in series, and
   a rectifying control module, comprising:
   a phase control unit comprising a live wire switch and a ground wire switch; one end of the live wire switch coupled to the live wire, and a control end of the live wire switch coupled to an input power source; one end of the ground wire switch coupled to the ground wire, and a control end of the ground wire switch coupled to the input power source,
   a low-side drive unit coupled to the other end of the live wire switch, the other end of the ground wire switch, and the bridge rectifying unit,
   a self-drive unit coupled to the low-side drive unit and the bridge rectifying unit,
   a current detection unit coupled to the AC power source, and
   a turned-off control unit coupled to the current detection unit, wherein a positive half cycle of the AC power source turns on the live wire switch and provides a live wire signal, and a negative half cycle of the AC power source turns on the ground wire switch and provides a ground wire signal; the low-side drive unit is configured to provide a low-side control signal group according to the live wire signal and the ground wire signal; the self-drive unit is configured to establish a drive voltage according to the AC power source, and provide a high-side control signal group according to the low-side control signal group; the bridge rectifying unit is configure to rectify the AC power source into a DC power source according to the low-side control signal group, the high-side control signal group, and the drive voltage to continuously turned on the first switch and the fourth switch in the positive half cycle, and continuously turned on the second switch and the third switch in the negative half cycle, and wherein the current detection unit is configured to detect an input current of the AC power source and provide a current signal to the turned-off control unit; the turned-off control unit is configured to determine whether the bridge rectifying unit is in a light-loading condition according to the current signal and control the rectifying control module not working according to the light-loading condition to stop providing the low-side control signal group and the high-side control signal group for controlling the bridge rectifying unit.

2. The bridge rectifying control apparatus in claim 1, wherein the bridge rectifying unit comprises:

a high-side unit, comprising the first switch and the second switch; the first switch coupled to the live wire, and connected to a first diode in parallel, and the second switch coupled to the ground wire and the first switch, and connected to a second diode in parallel, and a low-side unit, comprising the third switch and the fourth switch; the third switch coupled to the live wire and the first switch, and connected to a third diode in parallel, and the fourth switch coupled to the ground wire, the second switch, and the third switch, and connected to a fourth diode in parallel, wherein the high-side control signal group comprises a first control signal provided to the first switch, and a second control signal provided to the second switch; the low-side control signal group comprises a third control signal provided to the third switch, and a fourth control signal provided to the fourth switch; the rectifying control module is configured to provide the first control signal and the fourth control signal according to the positive half cycle, and provide the second control signal and the third control signal according to the negative half cycle.

3. The bridge rectifying control apparatus in claim 2, wherein the low-side drive unit is configured to provide the fourth control signal for turning on the fourth switch according to the live wire signal, and provide the third control signal for turning on the third switch according to the ground wire signal; the self-drive unit is configured to provide the first control signal according to the fourth control signal and provide the second control signal according to the third control signal.

4. The bridge rectifying control apparatus in claim 2, wherein the self-drive unit comprises:

a first self-drive unit comprising a first bootstrap capacitor and a first drive unit; the first bootstrap capacitor coupled to the live wire and the first drive unit, and the first drive unit coupled to the low-side drive unit and the first switch, wherein the drive voltage comprises a first drive voltage, and the first bootstrap capacitor is configured to establish the first drive voltage according to the negative half cycle; the first drive unit is configured to provide the first control signal according to the fourth control signal, and provide the first drive voltage and the first control signal to turn on the first switch in the positive half cycle.

5. The bridge rectifying control apparatus in claim 2, wherein the self-drive unit comprises:

a second self-drive unit comprising a second bootstrap capacitor and a second drive unit; the second bootstrap capacitor coupled to the ground wire and the second drive unit, and the second drive unit coupled to the low-side drive unit and the second switch, wherein the drive voltage comprises a second drive voltage, and the second bootstrap capacitor is configured to establish the second drive voltage according to the positive half cycle; the second drive unit is configured to provide the second control signal according to the third control signal, and provide the second drive voltage and the second control signal to turn on the second switch in the negative half cycle.

6. The bridge rectifying control apparatus in claim 2, wherein the rectifying control module further comprises:

a falling edge adjustment circuit coupled to the phase control unit and the low-side drive unit, wherein the falling edge adjustment circuit is configured to adjust a falling point of a falling edge of the fourth control signal according to the live wire signal so that the fourth switch is turned off early a leading period according to the falling point; the falling edge adjustment circuit is configured to adjust the falling point of the third control signal according to the ground wire signal so that the third switch is turned off early the leading period according to the falling point.

7. The bridge rectifying control apparatus in claim 2, wherein the rectifying control module further comprises:

a voltage adjustment circuit coupled to the low-side drive unit, wherein the voltage adjustment circuit is configured to adjust a voltage level of the low-side unit.

8. The bridge rectifying control apparatus in claim 1, wherein the rectifying control module further comprises:

a counting unit coupled to the current detection unit and the turned-off control unit, wherein the counting unit is configured to provide a counting period; when a time period that the bridge rectifying unit is in the light-loading condition is greater than or equal to the counting period, the turned-off control unit is configured to control the low-side drive unit not working.

9. A rectifying control module configure to control a bridge rectifying unit to rectify an AC power source into a DC power source, and the bridge rectifying unit comprising a first switch and a third switch connected in series, and a second switch and a fourth switch connected in series, the rectifying control module comprising:

a phase control unit comprising a live wire switch and a ground wire switch; one end of the live wire switch coupled to a live wire, and a control end of the live wire switch coupled to an input power source; one end of the ground wire switch coupled to a ground wire, and a control end of the ground wire switch coupled to the input power source, and the live wire and the ground wire configured to receive the AC power source, a low-side drive unit coupled to the other end of the live wire switch, the other end of the ground wire switch, and the bridge rectifying unit, a self-drive unit coupled to the low-side drive unit and the bridge rectifying unit, a current detection unit coupled to the AC power source, a turned-off control unit coupled to the current detection unit, and wherein a positive half cycle of the AC power source turns on the live wire switch and provides a live wire signal, and a negative half cycle of the AC power source turns on the ground wire switch and provides a ground wire signal; the low-side drive unit is configured to provide a low-side control signal group according to the live wire signal and the ground wire signal, and provide the low-side control signal group to control the bridge rectifying unit; the self-drive unit is configured to establish a drive voltage according to the AC power source, provide a high-side control signal group according to the low-side control signal group, and provide the drive voltage and the high-side control signal group to control the bridge rectifying unit to continuously turned on the first switch and the fourth switch in the positive half cycle, and continuously turned on the second switch and the third switch in the negative half cycle, and wherein the current detection unit is configured to detect an input current of the AC power source and provide a current signal to the turned-off control unit; the turned-off control unit is configured to determine whether the bridge rectifying unit is in a light-loading condition according to the current signal and control the rectifying control module not working according to the light-loading condition to stop providing the low-side control signal group and the high-side control signal group for controlling the bridge rectifying unit.

10. The rectifying control module in claim 9, wherein the high-side control signal group comprises a first control signal and a second control signal, and the low-side control signal group comprises a third control signal and a fourth control signal; the low-side drive unit and the self-drive unit configured to provide the first control signal and the fourth control signal according to the positive half cycle, and provide the second control signal and the third control signal according to the negative half cycle.

11. The rectifying control module in claim 10, wherein the low-side drive unit is configured to provide the fourth control signal according to the live wire signal, and provide the third control signal according to the ground wire signal; the self-drive unit is configured to provide the first control signal according to the fourth control signal, and provide the second control signal according to the third control signal; the bridge rectifying unit is controlled by the first control signal and the fourth control signal to rectify the positive half cycle into the DC power source, and the bridge rectifying unit is controlled by the second control signal and the third control signal to rectify the negative half cycle into the DC power source.

12. The rectifying control module in claim 10, wherein the self-drive unit comprises:

a first self-drive unit comprising a first bootstrap capacitor and a first drive unit; the first bootstrap capacitor coupled to the live wire and the first drive unit, and the first drive unit coupled to the low-side drive unit and the first switch, wherein the drive voltage comprises a first drive voltage, and the first bootstrap capacitor is configured to establish the first drive voltage according to the negative half cycle; the first drive unit is configured to provide the first control signal according to the fourth control signal, and provide the first drive voltage and the first control signal in the positive half cycle.

13. The rectifying control module in claim 10, wherein the self-drive unit comprises:

a second self-drive unit comprising a second bootstrap capacitor and a second drive unit; the second bootstrap capacitor coupled to the ground wire and the second drive unit, and the second drive unit coupled to the low-side drive unit and the second switch, wherein the drive voltage comprises a second drive voltage, and the second bootstrap capacitor is configured to establish the second drive voltage according to the positive half cycle; the second drive unit is configured to provide the second control signal according to the third control signal, and provide the second drive voltage and the second control signal in the negative half cycle.

14. The rectifying control module in claim 10, wherein the rectifying control module further comprises:

a falling edge adjustment circuit coupled to the phase control unit and the low-side drive unit, wherein the falling edge adjustment circuit is configured to adjust a falling point of a falling edge of the fourth control signal according to the live wire signal so that the fourth switch is turned off early a leading period according to the falling point; the falling edge adjustment circuit is configured to adjust the falling point of the third control signal according to the ground wire signal so that the third switch is turned off early the leading period according to the falling point.

15. The rectifying control module in claim 9, wherein the rectifying control module further comprises:

a voltage adjustment circuit coupled to the low-side drive unit, wherein the voltage adjustment circuit is configured to adjust a voltage level of a low-side unit of the bridge rectifying unit.

16. The rectifying control module in claim 9, wherein the rectifying control module further comprises:

a counting unit coupled to the current detection unit and the turned-off control unit, wherein the counting unit is configured to provide a counting period to the turned-off control unit; when the time period that the bridge rectifying unit is in the light-loading condition is greater than or equal to the counting period, the turned-off control unit is configured to control the low-side drive unit not working.

17. A method of operating a bridge rectifying control apparatus using active switch, comprising the steps of:

receiving, by a bridge rectifying unit, an AC power source through a live wire and a ground wire, the bridge rectifying unit comprising a first switch and a third switch connected in series, and a second switch and a fourth switch connected in series, turning on, by a positive half cycle of the AC power source and an input power source, a live wire switch of a phase control unit to provide a live wire signal, and turning on, by a negative half cycle of the AC power source and the input power source, a ground wire switch of the phase control unit to provide a ground wire signal, providing, by a low-side drive unit, a low-side control signal group according to the live wire signal and the ground wire signal, establishing, by a self-drive unit, a drive voltage according to the AC power source, and providing a high-side control signal group according to the low-side control signal group, rectifying, by the bridge rectifying unit continuously turning on the first switch and the fourth switch in the positive half cycle, and continuously turning on the second switch and the third switch in the negative half cycle, the AC power source into a DC power source according to the low-side control signal group, the high-side control signal group, and the drive voltage, determining, by a turned-off control unit, whether the bridge rectifying unit is in a light-loading condition according to an input current of the AC power source, and controlling, by the turned-off control unit, the low-side drive unit to be grounded to stop providing the low-side control signal group and the high-side control signal group when the bridge rectifying unit is in the light loading condition so that the bridge rectifying unit is configured to passively rectify the AC power source into the DC power source.

18. The method of operating the bridge rectifying control apparatus in claim 17, further comprising:

in the first half cycle of the AC power source, the low-side drive unit does not work so that the bridge rectifying unit is configured to passively rectify the AC power source into the DC power source, and after the first half cycle of the AC power source, the low-side drive unit works so that the bridge rectifying unit is configured to actively rectify the AC power source into the DC power source by controlling the phase control unit, the low-side drive unit, and the self-drive unit.

* * * * *